US008237665B2

(12) United States Patent
Duncan et al.

(10) Patent No.: US 8,237,665 B2
(45) Date of Patent: Aug. 7, 2012

(54) INTERPRETING AMBIGUOUS INPUTS ON A TOUCH-SCREEN

(75) Inventors: Richard J. Duncan, Kirkland, WA (US); Leroy B. Keely, Portola Valley, CA (US); David A. Perry, Lynnwood, WA (US); Thomas H. Alphin, Kirkland, WA (US); Chris Devaraj, Seattle, WA (US); David A. Matthews, Seattle, WA (US); Steven P. Dodge, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 974 days.

(21) Appl. No.: 12/046,277

(22) Filed: Mar. 11, 2008

(65) Prior Publication Data

US 2009/0231285 A1   Sep. 17, 2009

(51) Int. Cl.
*G06F 3/041* (2006.01)
(52) U.S. Cl. ..................................... 345/173; 178/18.01
(58) Field of Classification Search .................. 345/157, 345/158, 169–173; 715/255, 851, 857, 864; 178/18.01
See application file for complete search history.

(56) References Cited

U.S. PATENT DOCUMENTS

| | | | |
|---|---|---|---|
| 5,553,296 A | 9/1996 | Forrest | |
| 5,953,687 A * | 9/1999 | Zink et al. | 702/168 |
| 6,073,036 A | 6/2000 | Heikkinen et al. | |
| 6,118,435 A * | 9/2000 | Fujita et al. | 345/173 |
| 6,647,145 B1 | 11/2003 | Gay | |
| 6,926,609 B2 | 8/2005 | Martin | |
| 7,148,875 B2 | 12/2006 | Rosenberg | |
| 2002/0084991 A1 | 7/2002 | Harrison | |
| 2005/0046621 A1 | 3/2005 | Kaikuranta | |
| 2006/0022956 A1 | 2/2006 | Lengeling | |
| 2006/0077183 A1 | 4/2006 | Studt | |
| 2006/0085757 A1 | 4/2006 | Andre | |

(Continued)

FOREIGN PATENT DOCUMENTS

JP  2005-182487  7/2005
KR  10-2007-0100209  10/2007

OTHER PUBLICATIONS

Albinsson, Par-Anders, and Zhai, Shumin, "High Precision Touch Screen Interaction," Symposium CHI 2003, Apr. 5-10 2003, Ft. Lauderdale, Florida, USA, 8 pp., http://www.almaden.ibm.com/cs/people/zhai/papers/TouchScreen.pdf.

(Continued)

*Primary Examiner* — Abbas Abdulselam
(74) *Attorney, Agent, or Firm* — Shook, Hardy & Bacon LLP

(57) ABSTRACT

A method for interpreting ambiguous click events in relation to click targets on a touch-screen display disposed at respective click target locations includes detecting a touch at a touch location and determining whether the touch location corresponds to a click target location. The method also includes searching for nearby click target locations in a predetermined click region and, upon locating a first click target location within the predetermined click region, associating the touch with the first click target location to identify a click event. A computing device for facilitating accurate touch input targeting with respect to a touch-screen display includes a display component, a touch detection component, a targeting component that associates a touch with a click target, and an event detection component that associates the touch with one of a right click event, a left click event, or a drag event.

27 Claims, 6 Drawing Sheets

U.S. PATENT DOCUMENTS

| | | |
|---|---|---|
| 2007/0152975 A1 | 7/2007 | Ohihara |
| 2007/0195067 A1 | 8/2007 | Zotov et al. |
| 2007/0250786 A1 | 10/2007 | Jeon et al. |

OTHER PUBLICATIONS

Benko, Hrvoje, Wilson, Andrew D. and Baudisch, Patrick, "Precise Selection Techniques for Multi-Touch Screens," Symposium CHI 2006, Apr. 22-28, 2006, Montreal, Quebec, Canada, 10 pp., https://research.microsoft.com/~awilson/papers/Benko-CHI06_final.pdf.

Ringel, Meredith, Berg, Henry Jin, Yuhui and Winograd, Terry, "Barehands: Implement-Free Interaction with a Wall-Mounted Display," Paper, Stanford University, 2 pp., http://graphics.stanford.edu/~merrie/papers/bhShort.PDF.

PCT Search Report and Written Opinion, International App. No. PCT/US2009/034179, Filed Feb. 16, 2009.

* cited by examiner

INTERPRETING AMBIGUOUS INPUTS ON A TOUCH-SCREEN

BACKGROUND

The ability to directly touch and manipulate data on a touch-screen has a strong appeal to users. In many respects, touch-screens can be used as a more advantageous input mechanism than the traditional mouse. When using a touch-screen, a user can simply tap the screen directly on the user interface element they wish to select rather than having to position a cursor over the user interface with a mouse. However, users often find it difficult to select items, or click targets, on a touch-screen as accurately as they can with a mouse.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention allow for analyzing a touch on a touch-screen display to determine whether the touch corresponds to a click target. If a touch on a touch-screen does not correspond to a click target a search may be performed to determine a nearby click target. The touch may then be associated with the nearby click target. Further embodiments of the present invention relate to disambiguating a touch on a touch-screen that may correspond to more than one click target.

According to an embodiment of the invention, a computing device may be provided that facilitates accurate touch input targeting with respect to click targets on a touch-screen display. The computing device may comprise a touch detection component that senses a touch on the touch-screen display. The computing device may further comprise a targeting component that searches for nearby click targets, and a disambiguation component that facilitates associating the touch with an appropriate click target.

These and other aspects of the invention will become apparent to one of ordinary skill in the art upon a reading of the following description, drawings, and the claims.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Figure 1:
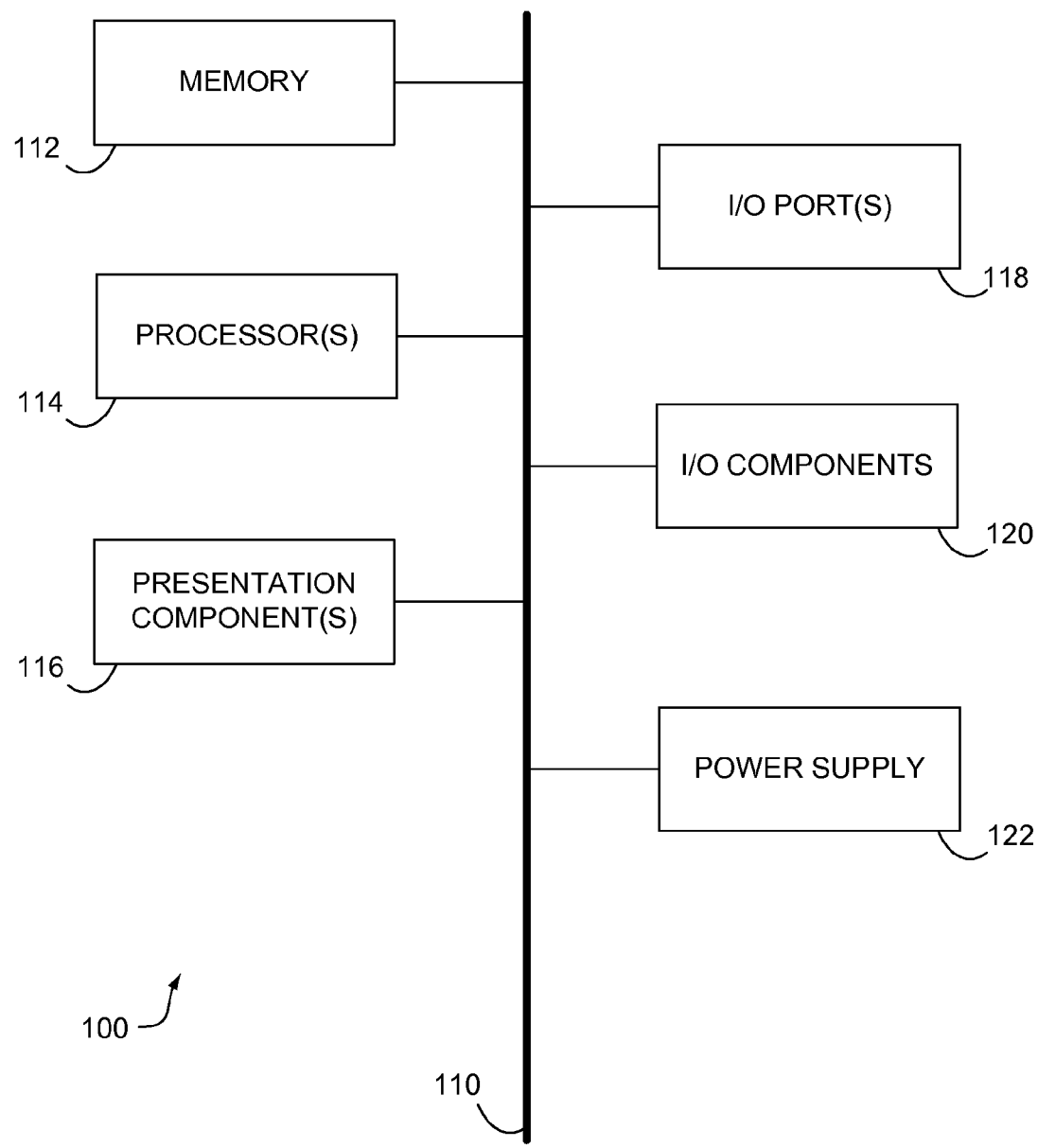
FIG. 1 is a block diagram of an exemplary computing environment suitable for use in implementing the present invention.

An exemplary operating environment in which various aspects of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. For example, the invention may be practiced in automated teller machines (ATMs), mobile phones, point-of-sale devices, informational kiosks and voting booths. The invention may also be practiced in distributed computing environments where tasks are performed by remote-processing devices that are linked through a communications network.

With reference to FIG. 1, an exemplary computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention.

Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, keyboard, pen, voice input device, touch input device, touch-screen device, interactive display device, or a mouse.

As previously mentioned, in one embodiment, the present invention relates to interpretation of ambiguous click events in relation to click targets on a touch-screen display by utilizing an algorithm which searches for a nearby click target. Another embodiment relates to a mechanism for detecting a touch, determining whether the touch should correspond to a right click event, a left click event, or a drag event, and determining where the touch event should occur.

Figure 2:
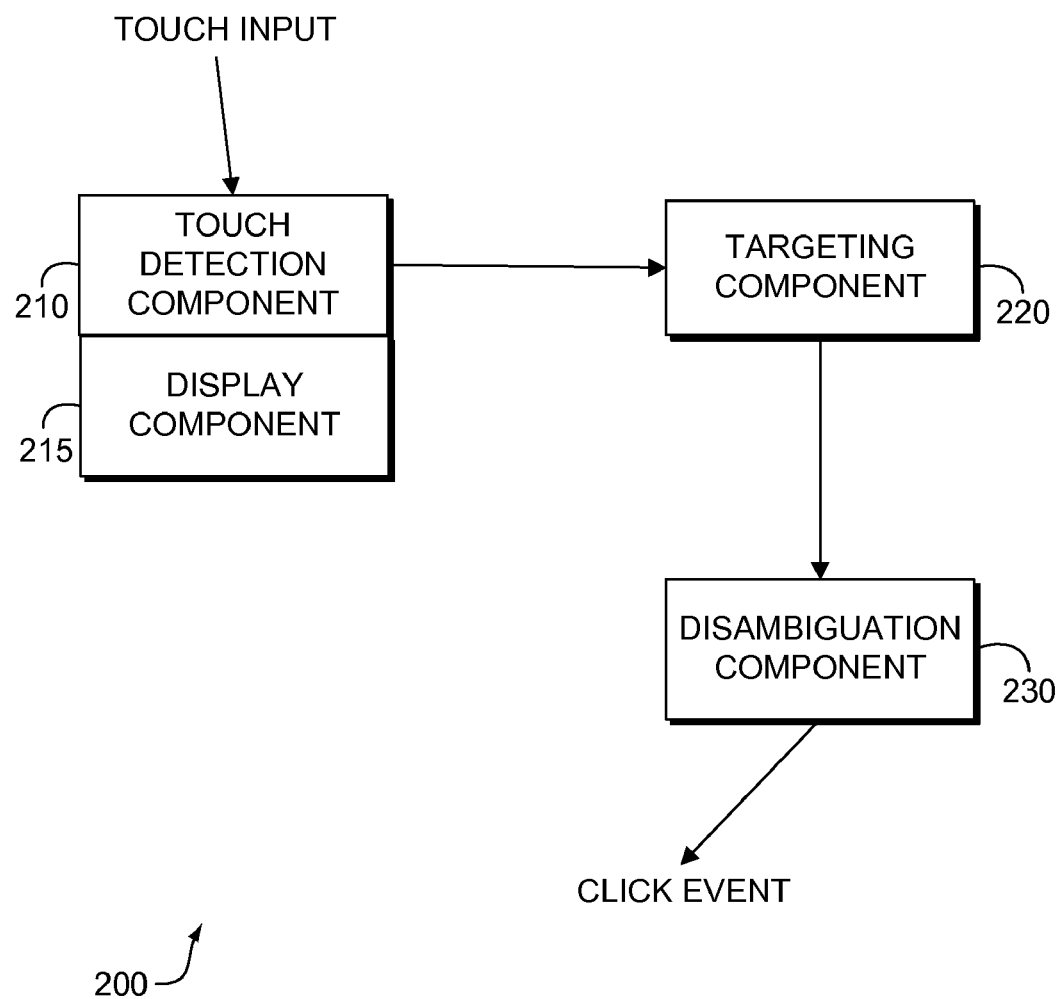
FIG. 2 is a block diagram illustrating an exemplary system according to an embodiment of the present invention.

Turning to FIG. 2, a block diagram is shown, illustrating the relevant components of an exemplary computing device 200 according to an embodiment of the present invention. As shown in FIG. 2, a touch input is first received in a touch detection component 210. A touch input generally is input generated by a user causing an object, such as the user's finger or a stylus, to make contact with the surface of a touch-screen device. Often, touch-screens do not display a cursor or any other feedback to the user that enables targeting with a stylus or finger. Although many applications relating to the use of a stylus have hover behavior, wherein a cursor or widget is displayed directly below the position of the stylus, other applications and devices do not have this feature. Most applications that accept input from a finger contacting a touch-screen offer no such feature, or if they do, the cursor often only appears after a touch and so does not assist with targeting.

Moreover, because a user's finger is generally larger than a stylus, it can be more difficult for the user to see what is directly below the finger, making targeting more difficult. In some cases, for example in the case of many ATMs, a protective glass is disposed over the touch-screen that distorts the apparent position of objects on the touch-screen—a phenomenon referred to as parallax—may further complicate targeting with a finger. Therefore, it will be readily apparent that the present invention may be suited for use in computing devices that accept touch-screen input from either a stylus or a finger, but that the advantages offered by the present invention may be most important when the invention is applied in the context of finger input.

Referring to FIG. 2, the touch-screen device 200 may include, for example, a touch-sensitive display screen. Typically, a touch-sensitive display screen is made up of a touch detection component 210, or touch sensor, constructed over a display component 215 and configured to present a touch surface that corresponds to images that are displayed by the display component 215. Thus, a user may manipulate a displayed object by touching the portion of the touch detection component 210 located directly above the object. In other embodiments, as used herein, a touch-screen device may include any device configured for providing input to a computing device as a result of touching a surface with a finger or other object, such as a stylus. For example, in an embodiment, the touch-screen device 200 may include a touch-pad that is provided separate from the display component 215.

The display component 215 displays images in a manner similar to that of a typical monitor on a personal computer. A portable device incorporating a touch-screen would probably use a liquid crystal display because of that display's low weight and small depth. Other display technologies are possible such as, for example, cathode ray tubes, plasma screens, electro-luminescent screens, and organic light-emitting diodes.

In an embodiment, the touch detection component 210 sits on top of the display component 215. The touch detection component 210 is transparent so that the display component 215 may be seen through it. Many touch detection technologies are known in the art, including four-, five-, and eight-wire resistive, capacitive, near field, optical, and acoustic wave. The touch detection component 210 generally detects touches within a set of coordinate axes, identifying a vertical and horizontal coordinate corresponding to a touch. The vertical and horizontal coordinates of the touch are sent to a targeting component 220, illustrated in FIG. 2.

In some embodiments, the touch detection component may detect multiple simultaneous touches, each of the touches corresponding to a particular set of coordinates. As will be readily appreciated by those skilled in the art, the various aspects of the present invention can be implemented in a device capable of receiving and processing multiple simultaneous touches, as well as devices capable only of processing a single touch.

The targeting component 220 applies an algorithm to determine whether the touch will trigger a click event. As used throughout this document, a click event may include any type of input event that can be triggered by touching a touch-screen device. In one embodiment, a click event may include a click such as a "left click" or a "right click." It will be readily appreciated by those skilled in the art that, although the term "click" referred originally to an input event triggered by depressing a button located on a mouse, the term now broadly may refer to any similar event triggered by a user input such as, for example, by a touch on a touch-screen. In an embodiment, a click event may comprise actions such as, for example, a left click event, a right click event, or a drag event. For example, when using a mouse, a user may trigger a left click event by positioning the cursor that corresponds to the mouse over the desired click target, and press and release the left button located on top of the mouse.

Similarly, in accordance with one embodiment of the present invention, a user may trigger a left click event, for example, by tapping a location on a touch-screen located above the desired click target. A user may trigger a right click event, for example, by placing his or her finger on the touch-screen at a location above the click target and holding his or her finger at that location for a certain amount of time. Further, in an embodiment, a user may trigger a drag event by placing his or her finger on a touch-screen and without lifting his or her finger, dragging his or her finger from one location on the touch-screen to another location thereon. In various embodiments, a click event, as used herein, may include other input events such as, for example, a drag, a turning tap, a hold, a stroke, a hold-drag into click, an ink drag, or a gesture.

The targeting component 220 determines whether a touch will trigger a click event by first determining whether the location of the touch corresponds to the location of a click target, which may be referred to as a click target location. The targeting component 220 then applies an algorithm to determine whether there are one or more click target locations in the proximity of the location of the touch. Data representing the touch and the associated click target are sent in a message to an event detection component 230.

The disambiguation component 230 facilitates associating the touch with an appropriate click target. In one embodiment, if only one click target location is found in the vicinity of the location of the touch, the disambiguation component 230 generates a click event by associating the touch with the click target that corresponds to that click target location. In an embodiment, that click target location may correspond to the location of the touch. In another embodiment, the click target location may correspond to a location nearby the location of the touch. The resulting click event may be used or displayed by the application or operating system utility that controls the display 215 and touch detection 210 components.

In a further embodiment, the disambiguation component 230 may provide a magnifier that disambiguates the area around the location of the touch. In an embodiment, a magnifier is provided if there are more than one click targets located nearby the location of the touch. As used herein, a magnifier may include any user interface or modification to a user interface that displays an enlarged view of a portion of the user interface that contains click targets. In an embodiment, the magnifier may be, for example, a second user interface that is superimposed over a first user interface, giving the effect of a magnifying glass being held over a portion of the first user interface. In various embodiments, the magnifier may be configured so that a user may interact with objects displayed within the magnifier in exactly the same manner that the user can interact with objects displayed on the first, or any other, user interface. For example, a user may be able to perform any number of operations on objects presented in the magnifier such as, for example, click, drag, right click, etc. Thus, the magnifier may be provided without sacrificing any functionality of the user interface.

Figure 6:
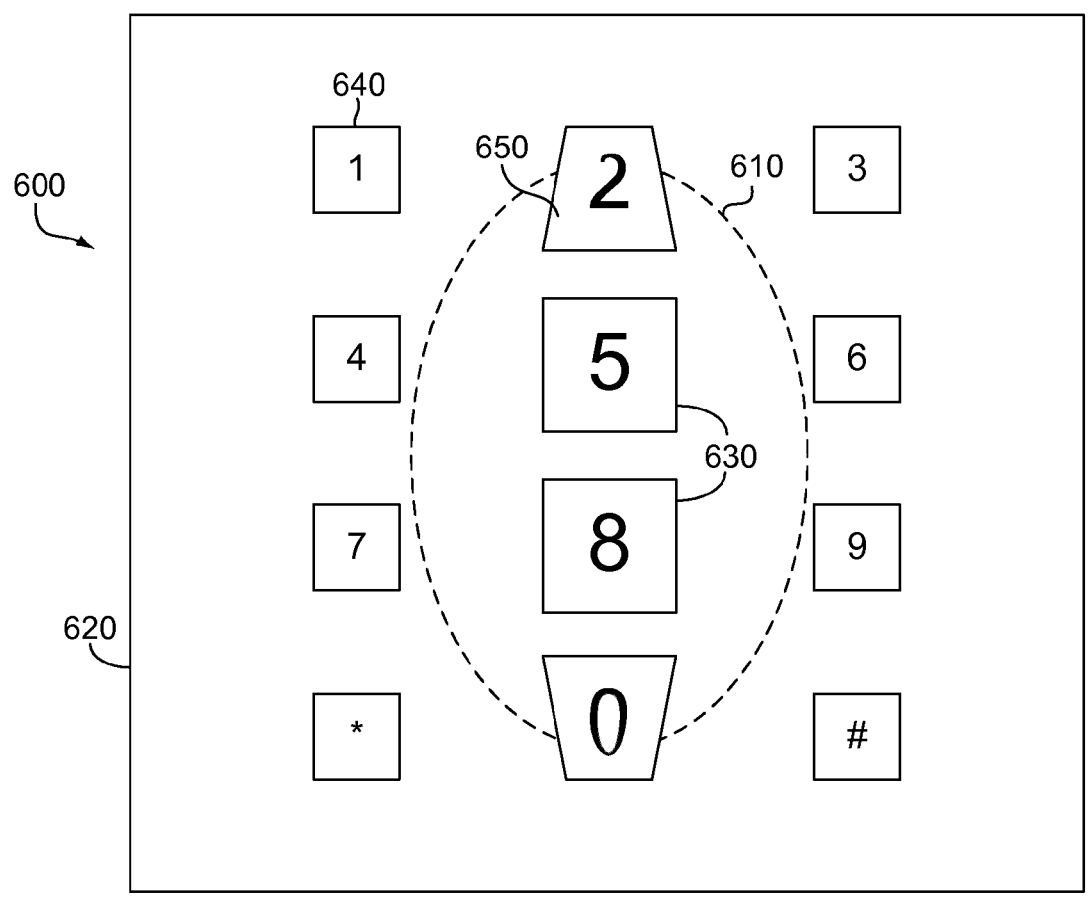
FIG. 6 is an exemplary screenshot illustrating a disambiguating magnifier according to an embodiment of the present invention.

Turning briefly to FIG. 6, an exemplary screenshot illustrating a disambiguating magnifier according to an embodiment of the present invention is shown. In this example, a magnifier 610 is presented as a second user interface that gives the effect of a magnifying lens being held over a portion of a first user interface 620. As shown in FIG. 6, user interface 620 includes a display of a virtual keypad such as a keypad found on a telephone. In this example, the computing device has determined that there are two click targets 630 located nearby the location of a touch. The magnifier 610, as shown in FIG. 6, displays the click targets 630 that are located nearby the location of the touch as larger than other objects 640, which may also be click targets. In the embodiment illustrated in FIG. 6, the magnifier 610 gives the effect of a "fish-eye" lens by providing the greatest degree of enlargement in the center of the magnifier. The degree of enlargement gradually decreases toward the outer edges of the magnifier, as illustrated at 650. The illustration shown in FIG. 6 is only an example of a magnifier that can be utilized in accordance with various implementations of the present invention.

Figure 3:
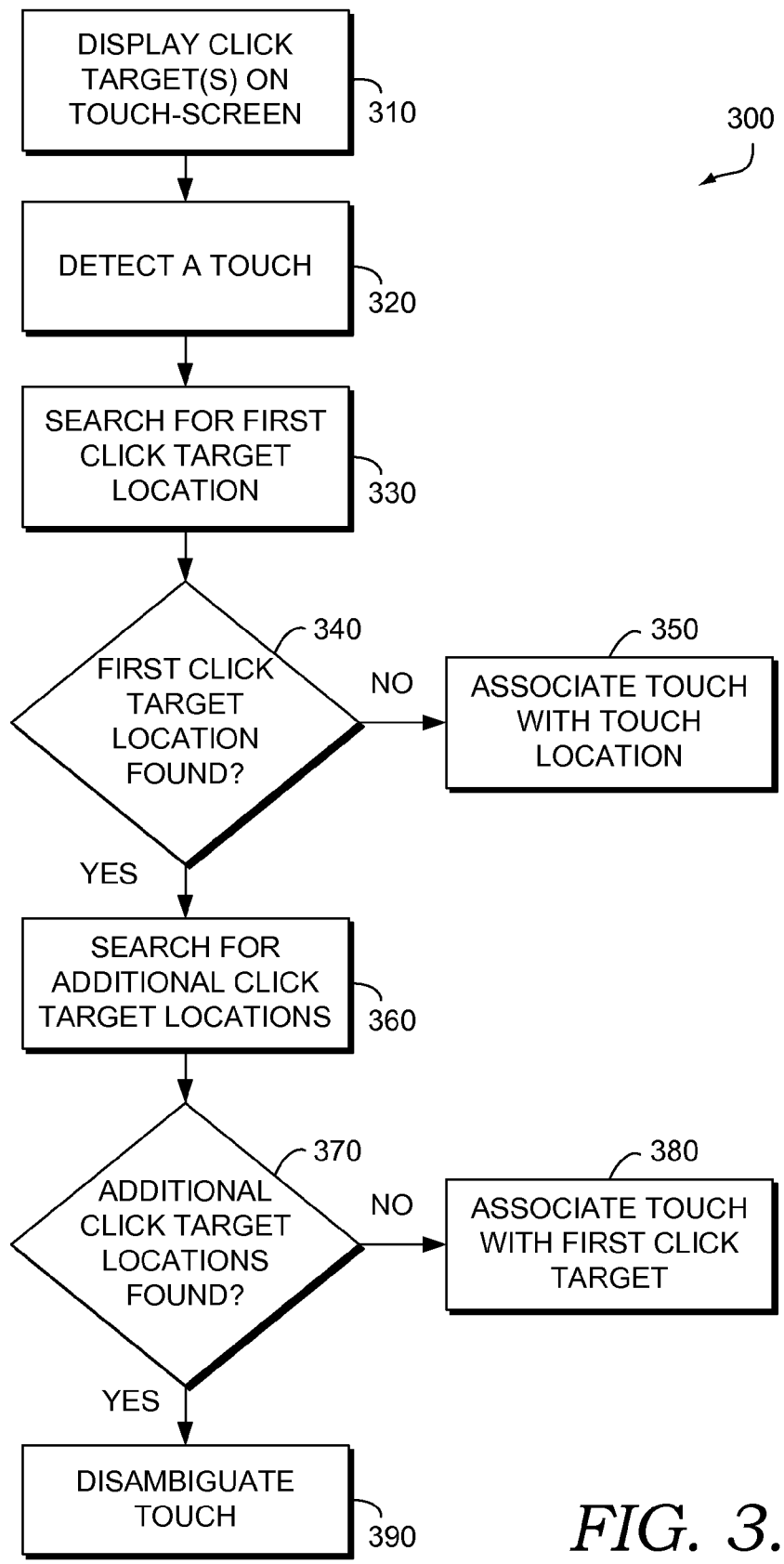
FIG. 3 is a flow diagram illustrating an exemplary method of interpreting an ambiguous touch input in relation to one or more click targets displayed on a touch-screen display according to an embodiment of the present invention.

Turning now to FIG. 3, a flow diagram is provided that shows an exemplary method 300 for interpreting an ambiguous touch input in relation to one or more click targets displayed on a touch-screen display according to an embodiment of the present invention. Although method 300 is presented as a sequence of steps, it will be appreciated by those skilled in the art that similar methods may be performed according to the present invention that involve the same or similar steps illustrated in FIG. 3, but performed in different orders. Nothing in this example is intended to limit the implementation of such a method to the particular order of steps illustrated herein.

Initially, as illustrated at step 310, one or more click targets are displayed on the touch-screen display, at the direction of the application or operating system utility that is selected to control the touch-screen display. Click targets may be objects that correspond to prescribed areas of the touch-screen display, or click target locations, that are configured such that making contact with those prescribed areas of the touch-screen causes the application or operating system utility to respond as if a similar region of a typical computer monitor had been "clicked" on by a mouse. A click target location may consist of one or more pixels on the touch-screen display.

As will be readily appreciated by those skilled in the art, a click target may be represented, for example, by an image such as a JPEG or GIF, a button, a scroll bar, text, etc. Those skilled in the art will appreciate that click targets may comprise any number of various objects used in conjunction with interactive display systems. Additionally, a click target may be configured to be able to be moved to different locations on the touch-screen display. For example, an icon representing a file within a folder generally can be dragged from one location to the other by utilizing a mouse. Such an icon is an example of a click target, and it will be readily apparent that many such click targets are capable of being moved and manipulated in various ways such as by dragging a first folder "into" a second folder, thus making the first folder a sub-folder of the second. The present invention is adaptable to operate within the context of any of these and other known applications of click targets.

Referring again to FIG. 3, as illustrated in step 320, after displaying click targets on a touch-screen, a touch may be detected at a first touch-screen location. In an embodiment of the present invention, a touch is detected by identifying a pair of coordinates that represent a location on the touch-screen that has been contacted by a user's finger, for example. That touch may or may not be made on the touch-screen in a location that corresponds to a click target. A touch may consist, for example, of a user tapping the touch-screen, resting his or her finger on the touch-screen, or moving his or her finger across the touch-screen. Furthermore, a touch-screen may be configured to detect contact with any object, or may be configured to detect only contact from a certain object such as a stylus.

As shown in FIG. 3, at step 330, once a touch has been detected, a search is conducted for a first click target location within a predetermined click region associated with the location of the touch. In one embodiment of the present invention, click target locations are identified by querying the application with which the click targets are associated to determine which pixels of the display correspond to click targets, as the application may have defined them. In an embodiment of the present invention, an accessibility framework is used to query the application.

As used herein, an accessibility framework may include any framework, system, program, or application that is capable of querying an application to receive information about objects on a user interface. The information received may include information such as whether an object is a click target. For example, accessibility frameworks may include frameworks such as Microsoft® Active Accessibility®, available from the Microsoft Corporation of Redmond, Wash., Microsoft® UI Automation, also available from the Microsoft Corporation of Redmond, Wash., and IAccessible2 available from the International Business Machines Corporation of Armonk, N.Y.

In another embodiment, it will be appreciated by those skilled in the art that click targets may be identified by using application-specific code configured to walk the document tree. In a further embodiment, a plug-in model may be provided with which new applications could register to facilitate identification of click targets. In still a further embodiment, variations of the methods described herein may be applied to different applications, windows, or frameworks based on various properties associated therewith by providing code that detects particular situations and causes particular variations of the methods or components described herein to be invoked. Additionally, it will be readily appreciated by those skilled in the art that the methods and systems described herein may not be appropriate in certain situations and that the present invention can be configured to detect those situations such as, for example, by receiving a prompt from an application or by executing code to detect the situation automatically. In such a situation, various aspects of the present invention may be disabled so as to provide an improved user experience.

In an embodiment of the present invention, the first click target location is a touch-screen location corresponding to a first click target. It will be appreciated by those skilled in the art that to perform steps 330-390 an algorithm may be used to check successive test locations within a predetermined click region associated with the location of the touch to determine whether any of the test locations correspond to a click target location. An example of such an algorithm is discussed below, with reference to FIG. 4. In an embodiment, the predetermined click region associated with the touch location may be defined by a set of test locations. For example, in one embodiment, the predetermined click region may correspond to a region of the touch-screen surrounding the touch location that is bounded by the test locations that are furthest away from the touch location. In another embodiment, the predetermined click region may be defined, for example by selecting a particular number of test locations. In various other embodiments, the click region may be defined arbitrarily or in accordance with any number of various other strategies known by those skilled in the art. In one embodiment, the boundaries of the click region may be the output of a function that has computing time as its input. In such an embodiment, the algorithm will discontinue after a certain amount of time has passed since it began.

With continued reference to FIG. 3, as shown at step 340, a determination is made as to whether a first click target location was found as a result of the search of step 330. If a first click target wasn't found, the touch is associated with the touch location, as shown at step 350, and no click event is triggered. If a first click target was found in the predetermined click region, a further search is performed, as shown at step 360, to determine whether there are any additional click target locations in the predetermined click region. It will be understood by those skilled in the art that there may be any number of click target locations in any given click region.

As illustrated at step 370 of FIG. 3, a determination is made as to whether any additional click target locations were found in the predetermined click region. If no additional click targets were found, the touch is associated with the first click target, which corresponds to the first click target location, as shown at step 380. This association may be performed automatically, in one embodiment, without any further input from a user. In other embodiments, a user may be presented with an option of whether to associate the touch with the first click target.

On the other hand, if additional click target locations were found in the predetermined click region, the touch is disambiguated, as shown at step 390 of FIG. 3. In one embodiment, the touch may be disambiguated by providing a magnifier, as discussed above with reference to FIG. 6. In various embodiments, the touch may be disambiguated by providing an additional user interface that presents an option to the user. In a further embodiment, the touch may be disambiguated by using visual effects such as highlighting or glow effects to highlight click targets. In other embodiments, various combinations of the disambiguation techniques described above may be used. In still further embodiments, the touch may be disambiguated by any other technique available.

A magnifier may display enlarged representations of the two click targets corresponding to the two click target locations found within the predetermined click region. Thus, a user may be able to more accurately touch the desired click target, at which point the user's touch may be associated with the proper click target. In various embodiments, a magnifier may provide an enlarged view of all of the located click targets. In further embodiments, a magnifier may provide an enlarged view of only some of the located click targets.

Figure 4:
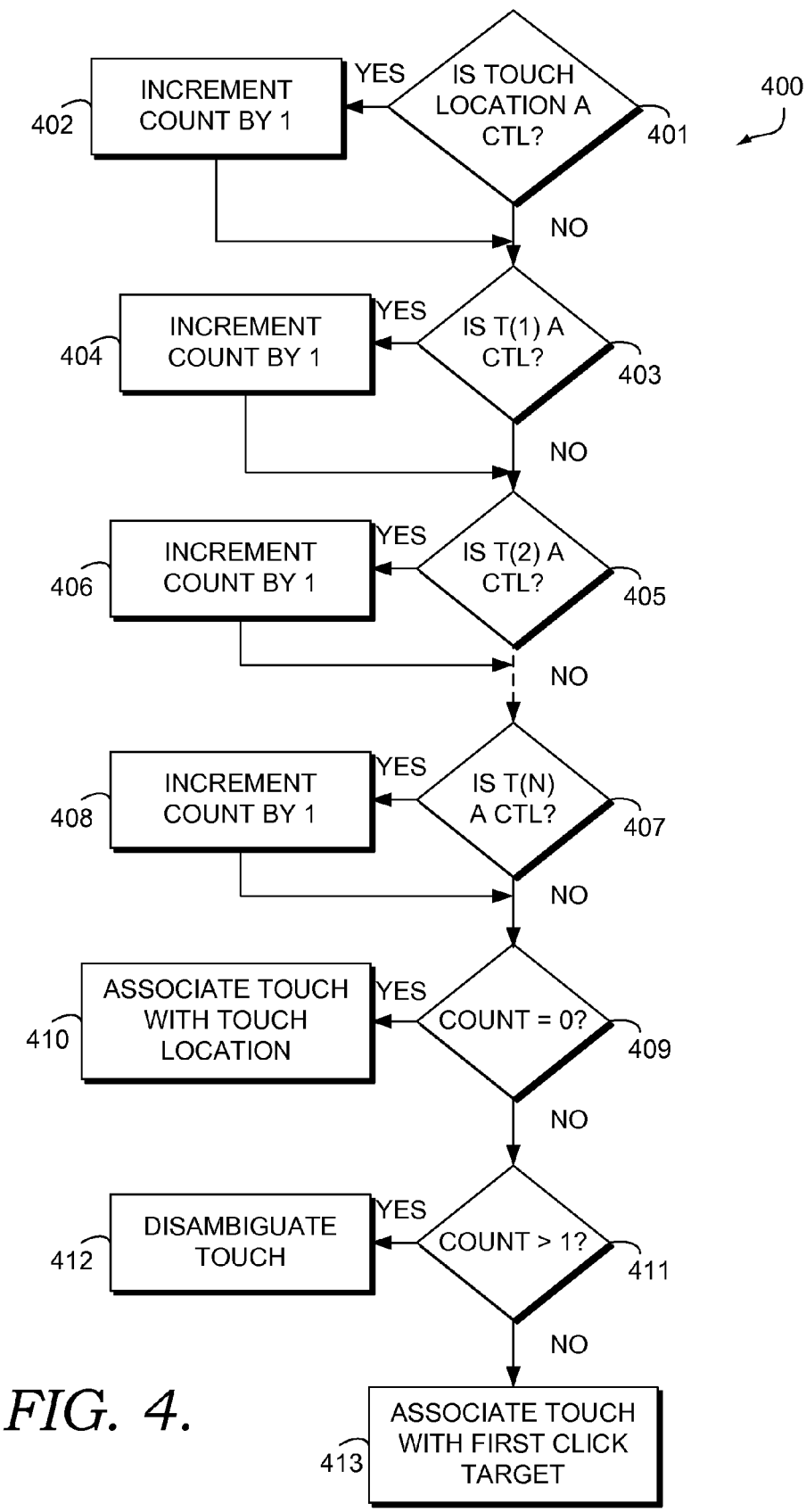
FIG. 4 is a flow diagram illustrating an exemplary algorithm for determining a first click target that corresponds to the location of a touch according to an embodiment of the present invention.

Turning now to FIG. 4, a flow chart is shown which illustrates an exemplary algorithm 400 for searching for click target locations within a predetermined click region according to an embodiment of the present invention. It will be apparent that the exemplary algorithm illustrated in FIG. 4 may be used to perform various steps of method 300 such as, for example, steps 330-390, although it will be understood that the sequence of those steps may not be identical to the sequence illustrated in FIG. 3. In other embodiments, algorithms such as the exemplary algorithm illustrated in FIG. 4 may be used independently of methods such as method 300. Such variations may be employed for various reasons such as for computing efficiency or for more straightforward programming. Variations such as the sequence of steps illustrated in FIG. 4 are within the ambit of the present invention.

In the exemplary embodiment illustrated in FIG. 4, the predetermined click region is defined by a set of test locations, $\{T(1), T(2), \ldots, T(N)\}$, where N is the number of test locations. Additionally, for clarity, the term "click target location" has been abbreviated in FIG. 4 as "CTL." The definition of the click region, as well as the selection of a value for N, may be made by an application, by an operating system, by a system administrator, or by any other entity capable of ascertaining the location of click targets on the touch-screen. For example, in one embodiment, N is selected such that enough test locations are established to effectively search a region while maintaining computing efficiency. As will be readily appreciated by those skilled in the art, the definition of the predetermined click region, as well as the selection of a value for N, may be based on any number of factors such as the nature of the screen layout, the location of click targets, the proximity of click targets to other click targets, the device upon which the invention is being implemented, the nature of the application that provides the click targets, the nature of the user, etc. Furthermore, it will be readily appreciated by those skilled in the art that the algorithm 400 may be modified in various ways such as, for example, by defining the predetermined click region in another manner or performing various steps in a different order.

As shown in FIG. 4, the first step 401 of the exemplary algorithm 400 is to determine whether the touch was made at a location that corresponds to a click target, i.e. whether the touch location is also a click target location. If the touch location is a click target location, the algorithm proceeds to step 402, wherein a click target location count is incremented by one. A click target location count such as illustrated at step 402 may include any programming mechanism or technique operable to keep track of a count of click target locations found in the predetermined click region. Those skilled in the art will understand that there are many such techniques. In an embodiment, as illustrated in FIG. 4, for example, one such technique includes defining a variable COUNT, setting COUNT equal to zero initially, and incrementing the value of COUNT by one each time a click target location is found in the predetermined click region. Accordingly, at step 401, the value of COUNT was zero, and at step 402, the value of COUNT is increased by one, thus setting the value to one. After incrementing the value of COUNT, the algorithm continues with step 403. It will be readily understood, as shown in FIG. 4, that if the touch location is not a click target, step 402 is skipped and the algorithm proceeds directly to step 403.

At step 403, a first test location, T(1), is checked to determine whether T(1) corresponds to a click target, i.e. whether T(1) is a click target location. The first test location, T(1) may be selected based on any number of factors and optimizations and may be located in any number of different directions with respect to the touch location. In an embodiment, for example, T(1) may be located one or more pixels above the touch location. In another embodiment, T(1) may be located one or more pixels below the touch location. In further embodiments, T(1) may be located to the right or left of the touch location. In still further embodiments, T(1) may be positioned in a diagonal direction from the touch location. The direction and distance (e.g., number of pixels) between the touch location and T(1) may be selected automatically or manually, and may be determined based on the characteristics and attributes of the display, the application, or any other component of hardware or software that is appropriate. As will be appreciated by those skilled in the art, any or all of the additional test locations may be located at any number of various positions and in any number of various configurations, the details of which are not intended to be limited by the description of the embodiments herein.

If T(1) is a click target location, as shown at step 404, the value of COUNT is incremented by one and the algorithm continues with step 405. Again, it will be understood that, if T(1) is not a click target location, the algorithm will skip step 404 and move directly from step 403 to step 405, as shown in FIG. 4. At step 405, a second test location, T(2), is checked to determine whether T(2) is a click target location.

The second test location, T(2), may be located anywhere on the touch-screen. In one embodiment, if the T(1) was above the touch location, T(2) may be one or more pixels below the touch location. In another embodiment, T(2) may be oriented to the right or left of the touch location or to the left or right of T(1). In yet another embodiment, T(2) may be located above T(1). In further embodiments, T(2) may be located at some point oriented diagonally with respect to either T(1) or the touch location. In various embodiments of the present invention, the location of T(2) may be based upon the same criteria that were considered in the selection of the location of T(1).

If T(2) is a click target location, as shown at step 406, the value of COUNT is incremented by one such as described above with respect to step 404 and the algorithm then proceeds with step 407. Again, if T(2) does not correspond to a click target location, step 406 will be skipped and the algorithm will proceed directly to step 407. As discussed previously, any number, e.g., N, of successive test locations may be selected and checked. It will be understood that the dotted arrow disposed between steps 405 and 407 indicates that one or more additional test locations may be checked in accordance with various embodiments of the invention. To provide a clear understanding of the algorithm 400, however, only the last test location T(N), will be discussed herein, although this discussion is not intended to limit the various parameters and options available to those skilled in the art with regard to various implementations of the present invention. For example, in one embodiment, a click region may only have two test locations, i.e. N=2. In other embodiments, a click region may have any number of other test locations.

At step 407, as illustrated in FIG. 4, a test location T(N) is checked to determine whether it is a click target location. If T(N) is a click target location, the value of COUNT is incremented by one at step 408. As illustrated, the algorithm continues with step 409. As discussed previously, if T(N) is not a click target location, step 408 is skipped and the algorithm proceeds directly to step 409.

At step 409, the value of COUNT is examined to determine whether the value is zero. A COUNT value of zero indicates that none of the test locations were click target locations, i.e. that no click target locations were found within the predetermined click region define by T(1), T(2), . . . , T(N). Thus, at step 410, if the value of COUNT is zero, the touch is associated with the touch location, and no click event is triggered. This result may be useful, for example, if a user did not intend to touch a click target. For example, a user may click on a blank part of an application window in order to move focus to that window. If the value of COUNT is not zero, the algorithm proceeds with step 411.

At step 411, a determination is made whether the value of COUNT is greater than one. A COUNT greater than one indicates that more than one click target locations were found within the predetermined click region. If the value of COUNT is greater than one, as shown at step 412, the click region is disambiguated as described above with reference to FIGS. 2 and 3. If the value of COUNT is not greater than one, i.e. the value of COUNT is equal to one, the algorithm proceeds to step 413. A COUNT equal to one indicates that only one click target location was found within the predetermined click region. As shown at step 413, if the value of COUNT is equal to one, the touch is associated with the first click target location, i.e. the one click target location identified.

Figure 5:
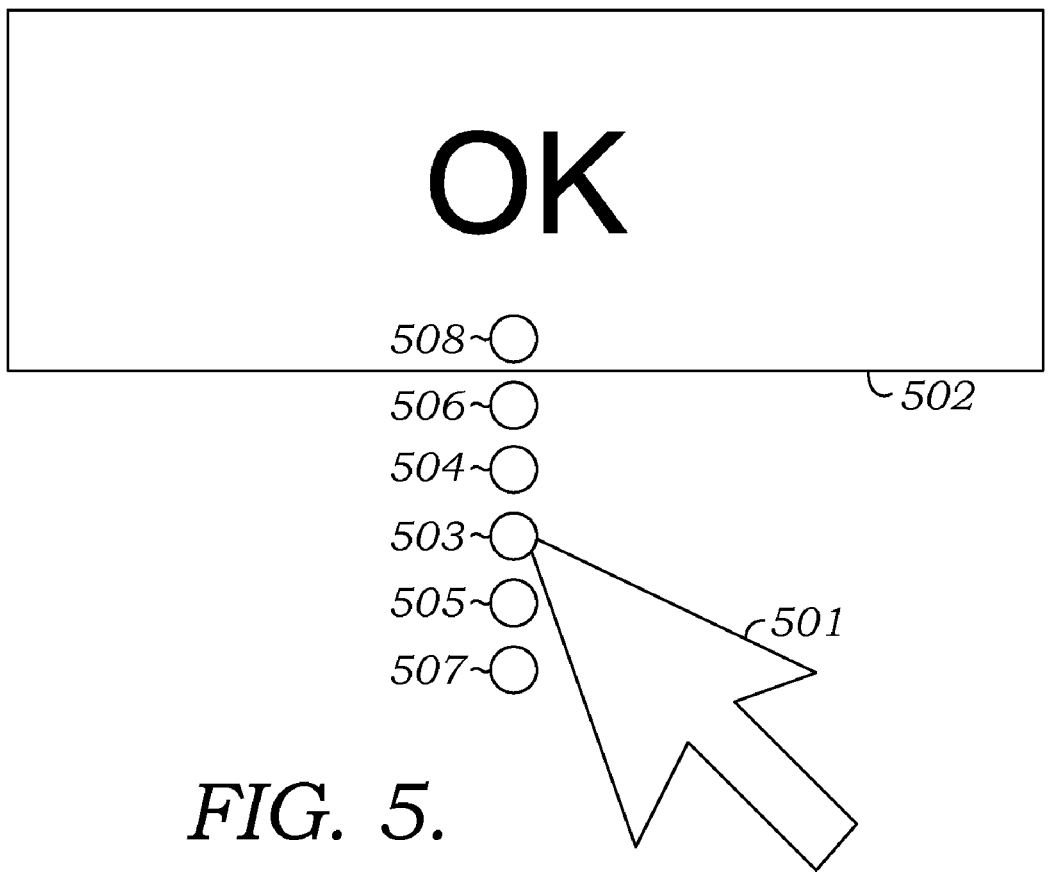
FIG. 5 is a schematic diagram illustrating an exemplary execution of a touch target interpretation algorithm according to an embodiment of the present invention.

Turning briefly to FIG. 5, a schematic diagram is shown illustrating an exemplary implementation of the algorithm 400 according to an embodiment of the present invention. It will be readily apparent to those skilled in the art that the embodiment illustrated in FIG. 5 represents one of many possible embodiments, and is not intended to limit the scope of the present invention. The touch is indicated by the illustration of the arrow, or cursor, 501 and in this example, the click target 502 is illustrated as an "OK" button. When a touch 501 is detected at touch location 503, a determination is made that the touch location 503 does not correspond to a click target 502. Therefore, a first test location 504, which is located just above the touch location 503, is checked to determine whether the first test location 504 corresponds to a click target 502. Although not illustrated in the exemplary embodiment of FIG. 5, in various other embodiments of the present invention, the first test location 504 could be located below the touch location 503, to the left of touch location 503, or to the right of test location 503.

Upon determining that the first test location 504 does not correspond to a click target 502, a second test location 505, which, according to the embodiment illustrated in FIG. 5, is located just below the touch location 503, is checked to determine whether the second test location 505 corresponds to a click target 502. As with the first test location 504, in various embodiments not illustrated in FIG. 5, the second test location may be located above the touch location 503, above the first test location 504, or to the right or left of either location. Any of these locations or combination thereof are contemplated as being in accordance with the present invention.

In one embodiment, the location of each successive test location may be determined by the user, by the system, by a system administrator, by an application, or by a computer programmer, and may include any pattern or algorithm designed to check successive test locations. For example, in one embodiment, successive test locations may lie at various points along a spiral shape expanding outwardly from the touch location 503. In other embodiments, successive test locations may be arranged diagonally. Any other pattern or design is contemplated as being within the scope of the present invention.

Similarly, a third test location 506, a fourth test location 507, and a fifth test location 508 are checked, wherein, as shown in FIG. 5, it is determined that the fifth test location 508 corresponds to click target 502.

As can be understood, embodiments of the present invention provide methods for interpreting an input event from a touch-screen by detecting a touch and, if the touch is ambiguous in relation to one or more click targets displayed on the touch-screen, interpreting the touch as being associated with a first click target nearby. Other embodiments of the present invention provide disambiguating a touch by displaying a magnifier that enlarges a predetermined click region. Further embodiments of the present invention provide systems and computing devices for interpreting touches as click events.

According to various embodiments, the present invention can be implemented within a computing environment using accessibility calls to identify and interpret click targets and other aspects of a given user interface. As will be readily appreciated by those skilled in the art, accessibility calls may be invoked by code such as, for example, an accessibility program. In such an implementation, applications need not be rewritten to be compatible with implementations of embodiments of the present invention. In further embodiments of the present invention, the methods described herein may be implemented within a particular application or system, or in any other manner known by those skilled in the art.

In some embodiments of the present invention, the systems and methods described herein may be implemented simultaneously with other disambiguation techniques. In other embodiments, the present invention may be implemented in multi-touch touch-screen systems. Various further embodiments of the present invention provide for interpretation of touches by a tool, such as a stylus, on a touch-screen.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more tangible computer-readable media having machine-useable instructions embodied thereon that when executed by a computing device having a processor and a memory, cause the computing device to perform method of interpreting an ambiguous click event in relation to one or more click targets on a touch-screen display, the method comprising:

displaying one or more click targets on a touch-screen display, wherein the click targets are displayed at respective click target locations;

detecting, at the computing device, a touch at a first touch-screen location;

searching for a first one of said click target locations within a predetermined click region of the first touch-screen location;

upon locating a first one of said click target locations within the predetermined click region, searching for a second one of said click target locations within the predetermined click region; and if a second one of said click target locations is not located within the predetermined click region, associating the touch with a first click target corresponding to the first one of said click target locations.

2. The one or more tangible computer-readable media of claim 1, wherein upon locating a second one of said click target locations within the predetermined click region, further comprising providing a magnifier, wherein said magnifier comprises a user interface having an enlarged view of the predetermined click region.

3. The one or more tangible computer-readable media of claim 1, wherein the touch comprises a user's finger making contact with the touch-screen.

4. The one or more tangible computer-readable media of claim 1, wherein the touch comprises a stylus making contact with the touch-screen.

5. The one or more tangible computer-readable media of claim 1, wherein searching for a first one of said click target locations comprises:

determining whether the first touch-screen location is a click target location; and if the first touch-screen location is not a click target location, searching one or more pixels above the first touch-screen location.

6. The one or more tangible computer-readable media of claim 5, wherein if no click target is found at the one or more pixels above the first touch-screen location, searching one or more pixels below the first touch-screen location.

7. The one or more tangible computer-readable media of claim 1, wherein if no click target is located within the click region, determining that the touch should not be associated with a click target.

8. A computing device that facilitates accurate touch input targeting with respect to a touch-screen display, comprising:
- a display component that displays one or more click targets associated with an application, wherein each of the one or more click targets corresponds to a click target location;
- a touch detection component that senses a touch on a touch-screen display, wherein the touch corresponds to a first touch-screen location;
- a targeting component that searches for one or more click targets within a predetermined click region associated with the first touch location; and
- a disambiguation component that provides a magnified view of the predetermined click region if more than one click target is found within the predetermined click region.

9. The computing device of claim 8, wherein the touch comprises an ambiguous touch associated with a first touch-screen location that is not a click target location.

10. The computing device of claim 8, wherein the touch comprises an ambiguous touch associated with a first touch-screen location that is one of at least two click target locations, wherein the at least two click target locations are located within the predetermined click region.

11. The computing device of claim 8, wherein the targeting component searches for one or more click targets within a predetermined click region by querying the application.

12. The computing device of claim 11, wherein querying the application comprises using an accessibility framework to determine whether one or more objects located within the predetermined click region is a click target.

13. The computing device of claim 8, wherein the predetermined click region comprises a region of the touch-screen having a predetermined number of test locations therein.

14. The computing device of claim 8, wherein the click region comprises a region of the touch-screen having boundaries that are selected based on characteristics of the touch-screen display and characteristics of the application that generates the click targets.

15. The computing device of claim 8, wherein if only one click target is found within the predetermined click region, the disambiguation component associates the touch with the click target.

16. A method for interpreting a touch in relation to one or more click targets associated with an application, wherein said click targets are displayed on a touch-screen display, the method comprising:
- detecting a touch at a first touch-screen location;
- querying the application to determine a first click target located within a predetermined click region of the first touch-screen location;
- upon determining a first click target located within the predetermined region, querying the application to determine whether a second click target is located within the predetermined click region; and
- upon determining that a second click target is located within the predetermined click region, displaying a magnified view of the predetermined click region.

17. The method of claim 16, wherein the predetermined click region comprises a region of the touch-screen having a predetermined number of test locations therein.

18. The method of claim 17, wherein determining a first click target comprises:
- determining whether the first touch-screen location is a click target location, wherein a click target location is a location on the touch-screen display corresponding to a click target;
- if not, determining whether a first test location is a click target location, wherein the first test location is located one or more pixels above the first touch-screen location;
- if not, determining whether a second test location is a click target location, wherein the second test location is located one or more pixels below the first touch-screen location; and
- if not, determining whether a third test location is a click target location, wherein the third test location is located one or more pixels above the first test location.

19. The method of claim 18, further comprising determining whether any of the predetermined number of test locations in the test region is a click target location, wherein if none of the predetermined number of test locations in the click region is determined to be a click target location, determining that the touch should not be associated with a click target.

20. The method of claim 17, wherein after a selected amount of time, if no test location in the click region is determined to be a click target location, determining that the touch should not be associated with a click target.

21. A computing device having stored thereon computer-usable instructions that, when executed by the computing device, perform operations comprising:
- displaying one or more click targets on a touch-screen display, wherein the click targets are displayed at respective click target locations;
- detecting, at the computing device, a touch at a first touch-screen location;
- searching for a first one of said click target locations within a predetermined click region of the first touch-screen location;
- upon locating a first one of said click target locations within the predetermined click region, searching for a second one of said click target locations within the predetermined click region; and
- if a second one of said click target locations is not located within the predetermined click region, associating the touch with a first click target corresponding to the first one of said click target locations.

22. The computing device of claim 21, wherein upon locating a second one of said click target locations within the predetermined click region, further comprising providing a magnifier, wherein said magnifier comprises a user interface having an enlarged view of the predetermined click region.

23. The computing device of claim 21, wherein the touch comprises a user's finger making contact with the touch-screen.

24. The computing device of claim 21, wherein the touch comprises a stylus making contact with the touch-screen.

25. The computing device of claim 21, wherein searching for a first one of said click target locations comprises:
- determining whether the first touch-screen location is a click target location; and
- if the first touch-screen location is not a click target location, searching one or more pixels above the first touch-screen location.

26. The computing device of claim 25, wherein if no click target is found at the one or more pixels above the first touch-screen location, searching one or more pixels below the first touch-screen location.

27. The computing device of claim 21, wherein if no click target is located within the click region, determining that the touch should not be associated with a click target.

* * * * *